United States Patent [19]
Yokoyama et al.

[11] Patent Number: 5,527,875
[45] Date of Patent: Jun. 18, 1996

[54] PROCESS FOR PRODUCING AROMATIC POLYCARBONATE

[75] Inventors: Masuzo Yokoyama; Fumio Keitoku; Junji Takano; Masami Hasegawa; Yukiko Tatsukawa, all of Mie, Japan

[73] Assignee: Mitsubishi Chemical Corporation, Tokyo, Japan

[21] Appl. No.: 386,268

[22] Filed: Feb. 9, 1995

[30] Foreign Application Priority Data

Feb. 21, 1994 [JP] Japan .................................. 6-022771

[51] Int. Cl.⁶ .................................................. C08G 64/00
[52] U.S. Cl. ........................ 528/196; 528/198; 528/200; 528/204; 502/150; 502/152; 502/157; 502/164; 502/171
[58] Field of Search ...................... 528/196, 198, 528/200, 204; 502/157, 150, 164, 152, 171

[56] References Cited

U.S. PATENT DOCUMENTS

| | | | |
|---|---|---|---|
| 4,310,656 | 1/1982 | Brunelle | 528/196 |
| 4,330,664 | 5/1982 | Brunelle | 528/198 |
| 4,363,905 | 12/1982 | Brunelle | 528/196 |
| 5,221,761 | 6/1993 | Jen et al. | 558/268 |

FOREIGN PATENT DOCUMENTS

| | | |
|---|---|---|
| 675190 | 7/1966 | Belgium . |
| 0360578 | 3/1990 | European Pat. Off. . |
| 4312390 | 10/1994 | Germany . |
| 47-17978 | 5/1972 | Japan . |

OTHER PUBLICATIONS

Database WPI Week 9441, Derwent Publication Ltd., London, GB; AN 94–330153 & JP–A–6,256,497 (Teijin Ltd.), 13 Sep. 1994.

Chemical Abstracts, vol. 122, No. 16, 17 Apr. 1995, Columbus, Ohio, U.S.; Abstract No. 188437 & JP–A–6,329,783 (Teijin Ltd.) 29 Nov. 1994.

Database WPI Week 8813, Derwent Publications Ltd., London, GB; AN 88–087241 & JP–A–63,037,120 (Teijin KK) 17 Feb. 1988.

Primary Examiner—James J. Seidleck
Assistant Examiner—Terressa Mosley
Attorney, Agent, or Firm—Dilworth & Barrese

[57] ABSTRACT

A process for producing an aromatic polycarbonate having a weight average molecular weight of from 7,000 to 60,000 is disclosed, comprising melt polycondensing an aromatic diol compound (e.g., bisphenol A) and a diaryl carbonate compound (e.g., diphenyl carbonate) in the presence of a combination of (a) an alkali metal compound and (b) a phosphonium hydroxide compound (e.g., tetraethylphosphonium hydroxide) as an interesterification catalyst. The aromatic polycarbonate has improved heat resistance and hue.

22 Claims, No Drawings

PROCESS FOR PRODUCING AROMATIC POLYCARBONATE

FIELD OF THE INVENTION

This invention relates to a process for producing a polycarbonate by interesterification. More particularly, it relates to a process for producing an aromatic polycarbonate having improved heat resistance and improved hue by melt polycondensation of an aromatic diol compound and a diaryl carbonate compound.

BACKGROUND OF THE INVENTION

Aromatic polycarbonates have excellent mechanical characteristics such as impact resistance as well as heat resistance and transparency and have been employed as engineering plastics in a broad range of fields, such as bottles for carbonated beverages, electronic bases (CD bases), transfer belts, etc.

Industrially established processes for producing aromatic polycarbonate include the so-called phosgene process comprising reacting an aromatic diol, e.g., bisphenol, and phosgene by interfacial polycondensation. However, the phosgene process has many disadvantages, such as high toxicity of phosgene, the necessity of handling quantities of sodium chloride as a by-product, incorporation of the sodium chloride into the polymer produced, and influences of methylene chloride usually used as a reaction solvent on the environment. That is, the phosgene process incurs high costs for taking countermeasures against these health and environmental problems.

The so-called melt process or non-phosgene process is also well known. It consists of an interesterification reaction between an aromatic diol compound and a diaryl carbonate compound. It is received that the non-phosgene process is free of the above-mentioned problems associated with the phosgene process and also is more economical.

However, the aromatic polycarbonate obtained by the non-phosgene process using, for example, bisphenol A and diphenyl carbonate generally has a higher content of terminal hydroxyl groups than that obtained by the phosgene process using, for example, bisphenol A, phosgene, and a terminal blocker, etc. As a result, the former aromatic polycarbonate is generally inferior to the latter in heat resistance and hue. The residue of the catalyst used in the non-phosgene process also has adverse influences on the aromatic polycarbonate produced.

For example, the heat resistance in terms of temperature causing a 5% weight loss on heating (Td5%) of an aromatic polycarbonate obtained by the non-phosgene process is generally lower than that of an aromatic polycarbonate prepared by the phosgene process, i.e., about 500° C., sometimes lower by several tens of degrees C. or more, although it varies depending upon a kind and an amount of a catalyst for an interesterification reaction and a content of terminal hydroxyl groups of resulting aromatic polycarbonates.

Because molding of aromatic polycarbonates should be conducted at high temperatures, e.g., of around 320° C., in order to decrease the melt viscosity thereof, low heat resistance of aromatic polycarbonates gives rise to problems, such as cleavage of the polymer main chain, coloration, and reduction in mechanical strength. In particular, a high molding temperature is needed for obtaining thin-walled articles such as containers having a wall thickness of from 0.3 to 0.6 mm or articles with complicated shapes. Therefore, in order that an aromatic polycarbonate obtained by the non-phosgene process may be put to practical use, improvement in heat resistance and prevention of coloration are much desired.

It has been proposed to prepare an aromatic polycarbonate having an improved hue by using, as a catalyst for interesterification, a quaternary ammonium salt or phosphonium salt, e.g., tetraphenylphosphonium tetraphenylboranate or triphenylbutylphosphonium tetraphenylboranate (see JP-B-47-17978, the term "JP-B" as used herein means an "examined published Japanese patent application") or a boron hydride compound represented by the formula $R'_4PBH_nR_{4-n}$ (R, R': hydrocarbon group) (see U.S. Pat. Nos. 4,330,664 and 5,221,761).

However, while the aromatic polycarbonates obtained by using these catalysts have improved hue, they have insufficient molecular weight and poor heat resistance, or have a Td5% as low as 475° to 480° C. while having an improved hue and a high molecular weight.

U.S. Pat. No. 4,363,905 mentions production of an aromatic polycarbonate having a weight average molecular weight of 400 and a satisfactory hue by melt polycondensation of bisphenol A and diphenyl carbonate in the presence a combination of $Bu_4PBr$ and sodium phenolate as a catalyst system for interesterification (see Column 6, Table III, Run No. VIII). However, such a low-molecular weight polycarbonate encounters difficulty in injection molding or extrusion molding. The aforementioned U.S. patent also mentions production of an aromatic polycarbonate having a weight average molecular weight of 8,400 and an excellent hue by melt polycondensation of bisphenol A and bis(o-nitrophenyl) carbonate using the same catalyst system (Run No. III). In Run No. III, because of the use of bis(o-nitrophenyl) carbonate as a starting diaryl carbonate, the cost of material is high, the heat stability during the reaction is poor, and a decomposition product is incorporated into the produced aromatic polycarbonate resulting in deterioration of the hue and low mechanical strength, such as low impact strength.

SUMMARY OF THE INVENTION

An object of the present invention is to provide a non-phosgene process (i.e., an interesterification polycondensation process) for producing a heat-resistant aromatic polycarbonate having an improved hue and a high thermal decomposition temperature and showing substantially no change in molecular weight on heat melting, which process does not involve formation of a polymer gel.

The present invention provides a process for producing an aromatic polycarbonate having a weight average molecular weight of 7,000 to 60,000, which comprises melt polycondensing an aromatic diol compound and a diaryl carbonate compound represented by formula (I):

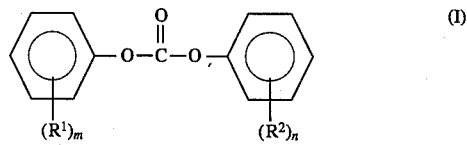

wherein $R^1$ and $R^2$ each represent an alkyl group having 1 to 10 carbon atoms or an alkoxy group; and m and n each represent 0 or an integer of 1 or 2, in the presence of a combination of (a) an alkali metal compound and (b) a phosphonium hydroxide compound represented by formula (II):

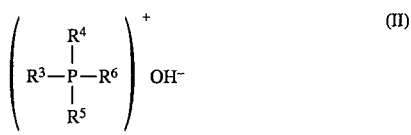

wherein $R^3$, $R^4$, $R^5$, and $R^6$ each represent an alkyl group having 1 to 12 carbon atoms, an aryl group, an aralkyl group or a cycloalkyl group,
as a catalyst for interesterification.

According to the present invention, the catalyst for interesterification exhibits sufficient activity even at small amounts to provide an aromatic polycarbonate with excellent hue and high heat resistance.

DETAILED DESCRIPTION OF THE INVENTION

The aromatic diol compound which can be used in the present invention is represented by formula (III):

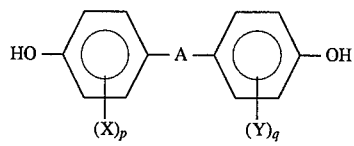

wherein A represents a simple bond or a divalent group selected from the group consisting of a substituted or unsubstituted, straight-chain, branched or cyclic divalent hydrocarbon group having 1 to 15 carbon atoms, —O—, —S—, —CO—, —SO—, and —$SO_2$—; X and Y, which may be the same or different, each represent a hydrogen atom, a halogen atom or a hydrocarbon group having 1 to 6 carbon atoms; and p and q each represent 0, 1 or 2.

Typical examples of the aromatic diols include bisphenols, e.g., bis(4-hydroxydiphenyl)methane, 2,2-bis(4-hydroxyphenyl)propane (i.e., bisphenol A), 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis( 4-hydroxy-3,5-dibromo)propane, 4,4-bis(4-hydroxyphenyl)heptane, and 1,1-bis(4-hydroxyphenyl)cyclohexane; biphenyls, e.g., 4,4'-dihydroxybiphenyl and 3,3',5,5'-tetramethyl-4,4'-biphenyl; bis(4-hydroxyphenyl)sulfone, bis(4-hydroxyphenyl) sulfide, bis(4-hydroxyphenyl) ether, and bis(4-hydroxyphenyl) ketone. Preferred of these is 2,2-bis(4-hydroxyphenyl)propane.

These aromatic diol compounds may be used either individually or as a combination of two or more thereof. In preparing a branched aromatic polycarbonate, a tri- or higher hydric phenol may be copolymerized in a small proportion. For the purpose of improving heat stability or resistance to hydrolysis of the resulting aromatic polycarbonate, a monohydric phenol, such as p-t-butylphenol or p-cumylphenol, may be used in combination for blocking of a terminal hydroxyl group.

Typical examples of the diaryl carbonate compound represented by formula (I) which can be used in the present invention are diphenyl carbonate, ditolyl carbonate, dixylyl carbonate, bisbutylphenyl carbonate, bisnonylphenyl carbonate, bismethoxyphenyl carbonate, and bisbutoxyphenyl carbonate. Of these, diphenyl carbonate is preferred.

The diaryl carbonate compound is usually used in excess, preferably in an amount of from 1.01 to 1.30 mol, still preferably from 1.02 to 1.20 mol, per mole of the aromatic diol compound.

The catalyst for interesterification according to the present invention is a combination of (a) an alkali metal compound and (b) a phosphonium hydroxide compound represented by formula (II).

Suitable alkali metal compounds (a) include inorganic alkali metal compounds, such as a hydroxide, a carbonate or a hydrogencarbonate of lithium, sodium, potassium, rubidium or cesium; and organic alkali metal compounds, such as an alcoholate, a phenolate or an organic carboxylate of the alkali metal. From the standpoint of heat resistance and hue of the produced aromatic polycarbonate, of these, cesium compounds are preferred of them. Still preferred of cesium compounds are cesium carbonate, cesium hydrogencarbonate, and cesium hydroxide.

While it is known that many phosphonium salt compounds are useful as a catalyst for interesterification, halogen salts and the like are not favorable in the practice of the present invention. Phosphonium salt compounds (b) which can be used in the present invention are the compounds represented by formula (II). In formula (II), $R^3$, $R^4$, $R^5$, and $R^6$ may be substituted with a polar group.

Specific examples of phosphonium hydroxide compounds of formula (II) are tetraethylphosphonium hydroxide, tetrabutylphosphonium hydroxide, tetraphenylphosphonium hydroxide, methyltriphenylphosphonium hydroxide, allyltriphenylphosphonium hydroxide, butyltriphenylphosphonium hydroxide, amyltriphenylphosphonium hydroxide, heptyltriphenylphosphonium hydroxide, hexyltriphenylphosphonium hydroxide, benzyltriphenylphosphonium hydroxide, and cinnamyltriphenylphosphonium hydroxide.

Examples of phosphonium hydroxide compounds of formula (II) in which $R^3$, $R^4$, $R^5$ or $R^6$ is substituted with a polar group are 4-carboxybutyltriphenylphosphonium hydroxide, 2-dimethylaminoethyltriphenylphosphonium hydroxide, 2-(1,3 -dioxolan-2-yl)ethyltriphenylphosphonium hydroxide, 4-ethoxybenzyltriphenylphosphonium hydroxide, ethoxycarbonylmethyltriphenylphosphonium hydroxide, formylmethyltriphenylphosphonium hydroxide, methoxymethyltriphenylphosphonium hydroxide, and tetrakis(hydroxymethyl)phosphonium hydroxide. Tetraethylphosphonium hydroxide, tetrabutylphosphonium hydroxide, tetraphenylphosphonium hydroxide, and allyltriphenylphosphonium hydroxide are preferred compounds for their activity in producing polycarbonates having a high molecular weight.

The above-mentioned interesterification catalyst components (a) and (b) are preferably employed in the form of an aqueous or alcoholic solution thereof.

Alkali metal compound (a) is used in an amount of from $10^{-10}$ to $10^{-5}$ mol, preferably from $10^{-8}$ to $10^{-6}$ mol, per mole of the aromatic diol compound.

When alkali metal compound (a) is introduced into a reaction system in the form of an aqueous solution thereof, water is used in an amount of from $10^{-6}$ to 1 mol, preferably from $1 \times 10^{-4}$ to $0.3 \times 10^{-1}$ mol, per mole of the aromatic diol compound.

Phosphonium hydroxide compound (b) is used in an amount of from $10^{-6}$ to $10^{-3}$ mol, preferably from $10^{-5}$ to $10^{-3}$ mol, per mole of the aromatic diol compound.

A preferred molar ratio of alkali metal compound (a) to phosphonium hydroxide compound (b) is from $10^{-6}$:1 to 1:1.

If the amount of the catalyst used is too large or if the (a)/(b) ratio is inadequate, the reaction tends to form a polymer gel or to form isomeric structures other than a carbonate bond, such as a salicylic ester structure, a dihydroxybenzophenone structure, and a xanthone structure, in the main polymer chain, resulting in adverse affects on the physical properties of the resulting aromatic polycarbonate. It follows that the resulting aromatic polycarbonate has reduced heat resistance or a deteriorated hue, which, combined with the influences of the residue of the catalyst, results in reductions in performance properties in melt molding or use.

If the amount of the catalyst is too small, an aromatic polycarbonate having a sufficiently high molecular weight for mechanical strength is scarcely obtained.

The interesterification melt polycondensation can be carried out in accordance with known melt polycondensation techniques for production of aromatic polycarbonates except for using a combination of alkali metal compound (a) and phosphonium hydroxide compound (b) as a catalyst.

In greater detail, the starting materials are subjected to melt polycondensation by interesterification under heating at atmospheric pressure or under reduced pressure while removing by-product produced. The reaction is usually carried out in two or more separate stages. A first stage reaction is performed by heating the starting materials and the catalyst at 100° to 200° C. in an inert gas atmosphere under atmospheric pressure or under increased pressure. During this stage, an interesterification reaction and a reaction of formation of a low-molecular weight oligomer having a number average molecular weight of from 400 to 1,000 occur. To effect a second stage reaction, the reaction temperature is increased to 200° to 250° C., and the pressure is diminished, e.g., to 20 Torr or less, whereby the interesterification reaction, the formation of the low-molecular weight oligomer, and chain growth of the oligomer (to a number average molecular weight of from 1,000 to 7,000) are allowed to proceed while driving the phenol by-product out of the reaction system. For further chain growth of the oligomer, the phenol and a diaryl carbonate are driven out of the system at a further increased temperature (e.g., 250° to 330° C.) under higher vacuum (e.g., 1Torr or less) thereby obtaining a high-molecular weight aromatic polycarbonate.

The reaction time in each reaction stage is determined appropriately depending on the progress of the reaction. For consideration of the hue of the resulting polymer, while the hue is not appreciably affected by the length of the reaction time under temperatures around 200° C., the reaction time at a temperature of 200° C. or lower is usually from 0.5 to 5 hours, and the reaction time at an elevated temperature of from 200° to 250° C. is usually from 0.1 to 3 hours. At temperatures exceeding 250° C., a prolonged reaction gives significantly adverse influences on the hue. Accordingly, a recommended reaction time of the final reaction stage is within 1 hour, and particularly from 0.1 to 1 hour.

The reaction may be conducted either in a batch system or in a continuous system, and various reaction apparatus may be used. Different types of apparatus are usually selected for each reaction stage. While not limiting, an apparatus having a stirring function for high viscosity liquid is preferred for the final stage where the viscosity of the reaction system greatly increases.

The aromatic polycarbonate obtained by the process of the present invention has a high molecular weight, namely a number average molecular weight (Mn) of from about 2,500 to about 25,000 and a weight average molecular weight (Mw) of from about 7,000 to about 60,000, with an Mw/Mn ratio preferably ranging from 2 to 3.

When the aromatic polycarbonate specifically weighing about 10 mg is heated in a nitrogen stream at a rate of temperature increase of 20° C./min using a thermogravimetric analyzer "200-TG/DTA 220" manufactured by Seiko Densi Kogyo Co., Ltd., the temperature at which the weight loss of the aromatic polycarbonate reaches 5% (based on the initial weight) is not less than 480° C., and preferably from 490° to 520° C. The above-identified temperature is taken as a heat resistance temperature and hereinafter is referred to as Td5%.

The hydroxyl group content of the resulting aromatic polycarbonate is preferably not more than about 0.1% by weight.

The aromatic polycarbonate obtained by the process of the present invention may be compounded with various additives, such as catalyst stabilizers, heat stabilizers, ultraviolet absorbents, antistatic agents, colorants, fluidity modifiers, parting agents, and reinforcing fillers.

If desired, the aromatic polycarbonate of the present invention may be blended with other resins, such as an ethylene-vinyl acetate copolymer, a polyamide resin, a polystyrene resin, polypropylene, etc.

The present invention will now be illustrated in greater detail by way of Examples, but the present invention should not be construed as being limited thereto. Unless otherwise indicated herein, all the percents are by weight.

Aromatic-polycarbonates obtained were analyzed according to the following methods.

1) Molecular Weight:

Measured by gel-permeation chromatography using "HLC- 8020", manufactured by Tosoh Corporation, in chloroform at 35° C. on polycarbonate conversion.

2) Td5%:

An aromatic polycarbonate sample specifically weighing about 10 mg is heated in a nitrogen stream at a rate of temperature increase of 20° C./min using a thermogravimetric analyzer "200-TG/DTA 220" manufactured by Seiko Densi Kogyo Co., Ltd., and the temperature at which the weight loss of the sample reached 5% based on the initial weight is obtained.

3) Hue:

An aromatic polycarbonate sample is heat-melted at 320° C. for 30 minutes and dissolved in methylene chloride to prepare a 4% solution, and the UV absorbance at 345 nm is measured. The greater the absorbance, the higher the degree of coloration.

EXAMPLE 1

In a 300 ml-volume SUS-316-made reactor equipped with a stirrer and a distillation column were charged 228 g (0.1 mol) of bisphenol A (BPA) and 23.1 g (0.107 mol) of diphenyl carbonate (DPC). After purging the reactor with nitrogen gas, 2.0 µl of a 2% aqueous solution containing 0.039 mg ($1.2 \times 10^{-7}$ mol) of cesium carbonate ($Cs_2CO_3$) and 15.2 µl of a 15% aqueous solution containing 2.28 mg ($8.2 \times 10^{-6}$ mol) of tetrabutylphosphonium hydroxide ($Bu_4POH$) (synthesized from an aqueous solution of a corresponding bromide using an anion-exchange resin) were added thereto as catalyst components in a nitrogen atmosphere.

The reactor was heated to 150° C., and the mixture was maintained in a molten state at that temperature under atmospheric pressure for 1 hour. After the temperature was increased to 200° C., the pressure was gradually decreased to 20 Torr, and the reaction mixture was maintained under these conditions for 1 hour to distill off phenol. Then, the temperature was further elevated to 250° C., and the inner pressure was dropped to 0.5 Torr at that temperature, and a polycondensation reaction was conducted for 1 hour to obtain about 25 g of an aromatic polycarbonate.

The analytical results of the polymer obtained are shown in Table 1 below.

EXAMPLES 2 TO 5

An aromatic polycarbonate was synthesized in the same manner as in Example 1, except for changing the amount of Bu$_4$POH as shown in Table 1.

The analytical results of the polymers obtained are shown in the Table.

COMPARATIVE EXAMPLE 1

An aromatic polycarbonate was synthesized in the same manner as in Example 5, except for using Bu$_4$POH alone as a catalyst.

The analytical results of the polymer obtained are shown in Table 1.

COMPARATIVE EXAMPLE 2

An aromatic polycarbonate was synthesized in the same manner as in Example 1, except for replacing the Bu$_4$POH aqueous solution with 15.8 µl of a 15% aqueous solution containing 2.37 mg (8.2×10$^{-6}$ mol) of tetrabutylphosphonium bromide (Bu$_4$PBr).

The resulting polycarbonate was slightly colored when observed with the naked eye. Coloration of the inner wall of the reactor was also observed. The analytical results of the polymer obtained are shown in Table 1.

COMPARATIVE EXAMPLE 3

An aromatic polycarbonate was synthesized in the same manner as in Example 1, except for replacing Bu$_4$POH with 1.66 mg (8.2×10$^{-6}$ mol) of tributyl phosphine (Bu$_3$P).

The analytical results of the polymer obtained are shown in Table 1.

molten state with stirring. To the mixture were added 122 µl of a 0.4% aqueous solution containing 4.89×10$^{-1}$ mg (1.5×10$^{-6}$ mol) of Cs$_2$CO$_3$ and 208 µl of a 5% aqueous solution containing 10.4 mg (3.75×10$^{-5}$ mol) of Bu$_4$POH as catalyst components. The molar ratio of Cs2CO$_3$ and Bu$_4$POH to BPA was 1×10$^{-6}$ and 2.5×10$^{-5}$, respectively.

The stirring was continued under these conditions for an additional period of 30 minutes, the temperature increased to 210° C. over a period of 30 minutes, the inner pressure dropped to 200 Torr, and the reaction was continued for 30 minutes under these conditions while removing the distillate. The inner temperature was further elevated to 240° C. over 30 minutes while decreasing the inner pressure to 15 Torr, and the reaction was continued under these conditions for 1 hour to obtain 379 g of a polycarbonate prepolymer having an Mw of 8,300.

A 120 g portion of the resulting polycarbonate prepolymer was put in a 200 ml-volume twin-cylinder mixer manufactured by Tosoku Seimitsusha K.K. and allowed to react at 270° C. and at 0.5 Torr for 60 minutes while removing by-products. products.

The analytical results of the resulting aromatic polycarbonate are shown in Table 2 below.

EXAMPLE 7

An aromatic polycarbonate was obtained in the same manner as in Example 6, except for using 245 µl of a 2×10$^{-3}$% aqueous solution containing 4.89×10$^{-3}$ mg of Cs$_2$CO$_3$ as a catalyst component.

The analytical results of the resulting aromatic polycarbonate are shown in Table 2 below.

TABLE 1

| Example No. | Interesterification Catalyst | | Analytical Results of Polymer | | |
|---|---|---|---|---|---|
| | Cs$_2$CO$_3$ (mol/mol-BPA) | Bu$_4$POH (mol/mol-BPA) | Mw | Td 5% (°C.) | Hue (UV, A$_{345}$) |
| Example 1 | 1.2 × 10$^{-6}$ | 8.2 × 10$^{-5}$ | 13,100 | 498 | 0.023 |
| Example 2 | 1.2 × 10$^{-6}$ | 12.4 × 10$^{-5}$ | 9,700 | 503 | 0.019 |
| Example 3 | 1.2 × 10$^{-6}$ | 4.1 × 10$^{-5}$ | 10,400 | 498 | 0.029 |
| Example 4 | 1.2 × 10$^{-6}$ | 2.1 × 10$^{-5}$ | 11,800 | 496 | 0.023 |
| Example 5 | 1.2 × 10$^{-6}$ | 1.0 × 10$^{-5}$ | 10,200 | 495 | 0.034 |
| Comparative Example 1 | — | 1.0 × 10$^{-5}$ | 4,200 | 459 | 0.010 |
| Comparative Example 2 | 1.2 × 10$^{-6}$ | Bu$_4$PBr 8.2 × 10$^{-5}$ | 6,600 | 476 | coloration |
| Comparative Example 3 | 1.2 × 10$^{-6}$ | Bu$_3$P 8.2 × 10$^{-5}$ | 4,400 | 480 | 0.035 |

EXAMPLE 6

In a 1.5 l-volume SUS-made reactor equipped with a stirrer and a distillation column were charged 343 g (1.5 mol) of BPA and 345 g (1.61 mol) of DPC. After purging the reactor with nitrogen gas, the mixture was heated to 180° C. in a nitrogen atmosphere and kept at that temperature in a

COMPARATIVE EXAMPLE 4

An aromatic polycarbonate was obtained in the same manner as in Example 6, except for using only 122 µl of a 0.4% aqueous solution containing 4.89×10$^{-1}$ mg (1.5×10$^{-6}$ mol) of Cs$_2$CO$_3$ as a catalyst.

The analytical results of the resulting aromatic polycarbonate are shown in Table 2 below.

TABLE 2

| Example No. | Interesterification Catalyst | | Mw of Prepolymer | Analytical Results of Polymer | | |
|---|---|---|---|---|---|---|
| | $Cs_2CO_3$ (mol/mol-BPA) | $Bu_4POH$ (mol/mol-BPA) | | Mw | Td 5% (°C.) | Hue (UV, $A_{345}$) |
| Example 6 | $1.0 \times 10^{-6}$ | $2.5 \times 10^{-5}$ | 8,300 | 33,300 | 498 | 0.017 |
| Example 7 | $1.0 \times 10^{-8}$ | $2.5 \times 10^{-5}$ | 4,200 | 20,400 | 495 | 0.021 |
| Comparative Example 4 | $1.0 \times 10^{-6}$ | — | 5,900 | 13,300 | 489 | 0.038 |

EXAMPLES 8 TO 18

A polycarbonate was obtained in the same manner as in Example 1, except for changing the kind and the amount of a phosphonium hydroxide compound as shown in Table 3. The phosphonium hydroxide compound was used as a 5% aqueous solution unless where noted. The $Cs_2CO_3$/BPA molar ratio was $1.2 \times 10^{-6}$.

The analytical results of the resulting polymers are shown in Table 3.

TABLE 3

| Example No. | Phosphonium Hydroxide Compound | | Analytical Results of Polymer | | |
|---|---|---|---|---|---|
| | Kind | Amount (mol/mol-BPA) | Mw | Td 5% (°C.) | Hue (UV, $A_{345}$) |
| Example 8 | tetraethylphosphonium hydroxide | $4.1 \times 10^{-5}$ | 9,300 | 504 | 0.018 |
| Example 9 | tetraphenylphosphonium hydroxide | $3.9 \times 10^{-5}$ | 9,500 | 496 | 0.011 |
| Example 10 | allyltriphenyl-phosphonium hydroxide | $4.1 \times 10^{-5}$ | 12,200 | 492 | 0.014 |
| Example 11 | butyltripheny-phosphonium hydroxide* | $3.9 \times 10^{-5}$ | 9,900 | 492 | 0.025 |
| Example 12 | amyltriphenyl-phosphonium hydroxide | $4.0 \times 10^{-5}$ | 10,700 | 501 | 0.016 |
| Example 13 | hexyltriphenyl-phosphonium hydroxide | $3.9 \times 10^{-5}$ | 9,700 | 491 | 0.033 |
| Example 14 | methyltriphenyl-phosphonium hydroxide | $3.9 \times 10^{-5}$ | 11,300 | 492 | 0.020 |
| Example 15 | 4-carboxybutyltriphenyl-phosphonium hydroxide | $4.1 \times 10^{-5}$ | 10,000 | 490 | 0.017 |
| Example 16 | tetrakis(hydroxymethyl)-phosphonium hydroxide | $4.1 \times 10^{-5}$ | 8,200 | 492 | 0.017 |
| Example 17 | (methoxymethyl)triphenyl-phosphonium hydroxide | $4.1 \times 10^{-5}$ | 11,000 | 494 | 0.031 |
| Example 18 | 2-(1,3-dioxolan-2-yl)-ethyltriphenylphosphonium hydroxide | $4.1 \times 10^{-5}$ | 9,200 | 499 | 0.016 |

Note: *Used as a 5% ethanol solution.

EXAMPLES 19 TO 21

A polycarbonate was prepared in the same manner as in Example 1, except for using each of the alkali metal compounds shown in Table 4 and $Bu_4POH$ in the amounts shown.

The analytical results of the resulting polymers are also shown in the Table.

TABLE 4

| Example No. | Interesterification Catalyst | | Analytical Results of Polymer | | |
|---|---|---|---|---|---|
| | Alkali Metal Compound | | Amount | | |
| | Kind | Amount (mol/mol-BPA) | of Bu$_4$POH (mol/mol-BPA) | Mw | Td 5% (°C.) | Hue (UV, A$_{345}$) |
| Example 19 | Li$_2$CO$_3$ | $1.2 \times 10^{-6}$ | $2.1 \times 10^{-5}$ | 7,200 | 486 | 0.040 |
| Example 20 | Na$_2$CO$_3$ | $1.2 \times 10^{-6}$ | $2.1 \times 10^{-5}$ | 7,600 | 489 | 0.033 |
| Example 21 | K$_2$CO$_3$ | $1.2 \times 10^{-6}$ | $2.1 \times 10^{-5}$ | 8,500 | 490 | 0.031 |

As described and demonstrated above, a high-molecular weight aromatic polycarbonate having high heat resistance and a satisfactory hue can be obtained by the present invention.

While the invention has been described in detail and with reference to specific examples thereof, it will be apparent to one skilled in the art that various changes and modifications can be made therein without departing from the spirit and scope thereof.

What is claimed is:

1. A process for producing an aromatic polycarbonate having a weight average molecular weight of from 7,000 to 60,000, which comprises melt polycondensing an aromatic diol compound and a diaryl carbonate compound represented by formula (I):

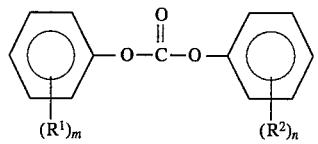

wherein R$^1$ and R$^2$ each represent an alkyl group having 1 to 10 carbon atoms or an alkoxy group; and m and n each represent 0 or an integer of 1 or 2, in the presence of a combination of (a) an alkali metal compound and (b) a phosphonium hydroxide compound represented by formula (II):

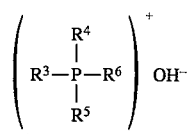

wherein R$^3$, R$^4$, R$^5$, and R$^6$ each represent an alkyl group having 1 to 12 carbon atoms, an aryl group, an aralkyl group or a cycloalkyl group, as a catalyst for interesterification, wherein (a) said alkali metal compound is present in an amount of from $10^{-10}$ to $10^{-5}$ mol per mole of the aromatic diol and (b) said phosphonium hydroxide compound is present in an amount of from $10^{-6}$ to $10^{-3}$ mol per mole of the aromatic diol.

2. A process for producing an aromatic polycarbonate having a weight average molecular weight of from 7,000 to 60,000, which comprises melt polycondensing an aromatic diol compound and a diaryl carbonate compound represented by formula (I):

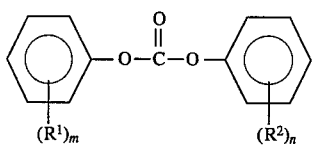

wherein R$^1$ and R$^2$ each represent an alkyl group having 1 to 10 carbon atoms or an alkoxy group; and m and n each represent 0 or an integer of 1 or 2, in the presence of a combination of (a) a cesium compound and (b) a phosphonium hydroxide compound represented by formula (II):

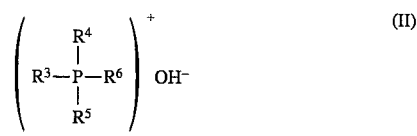

wherein R$^3$, R$^4$, R$^5$, and R$^6$ each represent an alkyl group having 1 to 12 carbon atoms, an aryl group, an aralkyl group or a cycloalkyl group, as a catalyst for interesterification, wherein (a) said cesium compound is present in an amount of from $10^{-10}$ to $10^{-5}$ mol per mole of the aromatic diol and (b) said phosphonium hydroxide compound is present in an amount of from $10^{-6}$ to $10^{-3}$ mol per mole of the aromatic diol.

3. A process as claimed in claim 2, wherein said cesium compound is selected from the group consisting of cesium carbonate, cesium hydrogencarbonate, and cesium hydroxide.

4. A process as claimed in claim 1, wherein said phosphonium hydroxide compound is selected from the group consisting of tetraethylphosphonium hydroxide, tetrabutylphosphonium hydroxide, tetraphenylphosphonium hydroxide, methyltriphenylphosphonium hydroxide, allyltriphenylphosphonium hydroxide, butyltriphenylphosphonium hydroxide, amyltriphenylphosphonium hydroxide, heptyltriphenylphosphonium hydroxide, hexyltriphenylphosphonium hydroxide, benzyltriphenylphosphonium hydroxide, cinnamyltriphenylphosphonium hydroxide, 4-carboxybutyltriphenylphosphonium hydroxide, 2-dimethylaminoethyltriphenylphosphonium hydroxide, 2-(1,3-dioxolan-2-yl)ethyltriphenylphosphonium hydroxide, 4-ethoxybenzyltriphenylphosphonium hydroxide, ethoxycarbonylmethyltriphenylphosphonium hydroxide, formylmethyltriphenylphosphonium hydroxide, methoxymethyltriphenylphosphonium hydroxide, and tetrakis(hydroxymethyl)phosphonium hydroxide.

5. A process as claimed in claim 1, wherein said catalyst for interesterification is a combination of cesium carbonate and a phosphonium hydroxide compound selected from the group consisting of tetraethylphosphonium hydroxide, tetrabutylphosphonium hydroxide, tetraphenylphosphonium hydroxide, and allyltriphenylphosphonium hydroxide.

6. A process as claimed in claim 1, wherein the molar ratio of alkali metal compound (a) to the phosphonium hydroxide compound (b) is from $10^{-6}$:1 to 1:1.

7. A process as claimed in claim 1, wherein aromatic polycarbonate has a 5% weight loss heating temperature (Td5%) of 480° C. or higher.

8. A process as claimed in claim 1, wherein said aromatic diol compound is bisphenol A.

9. A process as claimed in claim 1, wherein said diaryl carbonate compound is diphenyl carbonate.

10. A process as claimed in claim 1, wherein said polycarbonate has a number average molecular weight of from 2,500 to 25,000.

11. A process as claimed in claim 1, wherein the aromatic diol is selected from at least one of bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butylphenyl)-propane, 2,2-bis(4-hydroxy-3,5-dimethylphenyl)propane, 2,2-bis(4-hydroxy-3,5-dibromo)propane, 4,4-bis(4-hydroxyphenyl)-heptane, 1,1-bis(4-hydroxyphenyl)cyclohexane, 4,4'-dihydroxybiphenyl, 3,3',5,5'-tetramethyl-4,4'-biphenyl, bis(4-hydroxyphenyl)sulfone, bis(4-hydroxyphenyl) sulfide, bis(4-hydroxyphenyl)ether and bis(4-hydroxyphenyl)ketone.

12. A process as claimed in claim 1, wherein the diaryl carbonate is selected from at least one of diphenyl carbonate, ditolyl carbonate, dixylyl carbonate, bisbutylphenyl carbonate, bisnonylphenyl carbonate, bismethoxyphenyl carbonate and bisbutoxyphenyl carbonate.

13. A process as claimed in claim 1, wherein the diaryl carbonate is used in an amount of from 1.01 to 1.30 mol per mole of the aromatic diol.

14. A process as claimed in claim 13, wherein the diaryl carbonate is used in an amount of from 1.02 to 1.20 mol per mole of the aromatic diol.

15. A process as claimed in claim 1, wherein said alkali metal compound is selected from at least one of hydroxide, carbonate, hydrogencarbonate, alcoholate, phenolate and carboxylate of Li, Na, K, Rb or Cs.

16. A process as claimed in claim 1, wherein (a) said alkali metal compound is used in a amount of from $10^{-8}$ to $10^{-6}$ mol per mole of the aromatic diol and (b) said phosphonium hydroxide compound is used in an amount of from $10^{-5}$ to $10^{-3}$ mol per mole of the aromatic diol.

17. A process as claimed in claim 1, wherein (a) said alkali metal compound is introduced in the form of an aqueous solution, with water being present in an amount of from $10^{-6}$ to 1 mol per mole of the aromatic diol.

18. A process as claimed in claim 17, wherein the water is present in an amount of from $1\times10^{-4}$ to $0.3\times10^{-1}$ mol per mole of the aromatic diol.

19. A process as claimed in claim 1, being carried out in two or more separate stages.

20. A process as claimed in claim 19 comprising the following reaction stages (1)–(3):

(1) a first reaction stage performed by heating the starting materials and the catalyst to from 100° C. to 200° C. under atmospheric or increased pressure;

(2) a second reaction stage performed by increasing temperature to from 200° C. to 250° C. and diminishing the pressure; and (3) a third reaction stage performed by increasing the temperature to from 250° C. to 330° C. and carried out under high vacuum.

21. A process as claimed in claim 20, wherein the pressure is diminished in the second reaction stage to 20 Torr or less, and in the third reaction stage to 1 Torr or less.

22. A process as claimed in claim 20, wherein (1) the first reaction stage is preformed from 0.5 to 5 hours, (2) the second reaction stage is performed from 0.1 to 3 hours, and (3) the third reaction stage is performed from 0.1 to 1 hour.

* * * * *